United States Patent
Blanchard et al.

(10) Patent No.: US 8,607,454 B2
(45) Date of Patent: Dec. 17, 2013

(54) METHOD FOR PRODUCING A TURBOMACHINE BLADE MADE FROM A COMPOSITE MATERIAL

(75) Inventors: Stephane Pierre Guillaume Blanchard, Chartrettes (FR); Eric Bouillon, Le Haillan (FR); Dominique Coupe, Le Haillan (FR); Hubert Illand, Bonchamp (FR); Clement Roussille, Bordeaux (FR)

(73) Assignees: SNECMA, Paris (FR); Herakles, Le Haillan (FR)

( * ) Notice: Subject to any disclaimer, the term of this patent is extended or adjusted under 35 U.S.C. 154(b) by 116 days.

(21) Appl. No.: 13/263,176

(22) PCT Filed: Mar. 26, 2010

(86) PCT No.: PCT/FR2010/050565
§ 371 (c)(1),
(2), (4) Date: Oct. 6, 2011

(87) PCT Pub. No.: WO2010/116066
PCT Pub. Date: Oct. 14, 2010

(65) Prior Publication Data
US 2012/0055609 A1    Mar. 8, 2012

(30) Foreign Application Priority Data
Apr. 6, 2009  (FR) ...................... 09 52232

(51) Int. Cl.
*B21K 25/00* (2006.01)
*B23P 15/04* (2006.01)
(52) U.S. Cl.
USPC ............... 29/889.21; 29/889.23; 156/148
(58) Field of Classification Search
USPC ............ 156/89.11, 148; 29/889.2, 889.21, 29/889.23
See application file for complete search history.

(56) References Cited

U.S. PATENT DOCUMENTS

| | | | |
|---|---|---|---|
| 4,922,968 A | 5/1990 | Bottger et al. | |
| 5,506,046 A * | 4/1996 | Andersen et al. ............ | 428/34.5 |

(Continued)

FOREIGN PATENT DOCUMENTS

| | | |
|---|---|---|
| EP | 0 309 658 | 4/1989 |
| EP | 0 602 631 | 6/1994 |
| EP | 1 208 961 | 5/2002 |
| EP | 1 526 285 | 4/2005 |
| EP | 1 801 354 | 6/2007 |
| EP | 2 039 884 | 3/2009 |

OTHER PUBLICATIONS

International Search Report Issued Aug. 6, 2010 in PCT/FR10/050565 filed Mar. 26, 2010.
U.S. Appl. No. 13/607,131, filed Sep. 7, 2012, Roussille, et al.
U.S. Appl. No. 13/606,935, filed Sep. 7, 2012, Roussille, et al.

*Primary Examiner* — Scott W Dodds
(74) *Attorney, Agent, or Firm* — Oblon, Spivak, McClelland, Maier & Neustadt, L.L.P.

(57) ABSTRACT

A method of fabricating a composite-material turbomachine blade having platform incorporated therein includes separately making a blade platform element that includes rigidified fiber reinforcement and that has a shape close to that of a platform of the blade to be fabricated, with at least one opening being formed through the platform element. The opening has the shape of the profile of the airfoil of the blade to be fabricated. Three-dimensional weaving is used to make a flexible fiber blank as a single piece that includes blade airfoil-and-root preform portions. The platform element is engaged, via its opening, on the flexible fiber blank while deforming it so as to assemble the platform element with the fiber blank. The fiber blank is shaped together with the platform element assembled thereon to obtain a blade preform of a shape that is close to the shape of the blade to be fabricated. After shaping, the blade preform is consolidated in its shape in a shaper. Additionally, final densification of the consolidated blade preform is performed in order to obtain a composite-material blade having an incorporated platform.

15 Claims, 14 Drawing Sheets

(56) References Cited

U.S. PATENT DOCUMENTS

| | | | |
|---|---|---|---|
| 2002/0064456 A1* | 5/2002 | Marlin et al. | 415/191 |
| 2005/0084377 A1* | 4/2005 | Dambrine et al. | 416/223 R |
| 2006/0257260 A1 | 11/2006 | Dambrine et al. | |
| 2006/0283014 A1* | 12/2006 | Subramanian et al. | 29/889.71 |
| 2007/0148000 A1* | 6/2007 | Marusko et al. | 416/193 A |
| 2010/0021290 A1 | 1/2010 | Schaff et al. | |
| 2011/0027098 A1* | 2/2011 | Noe et al. | 416/241 B |

* cited by examiner

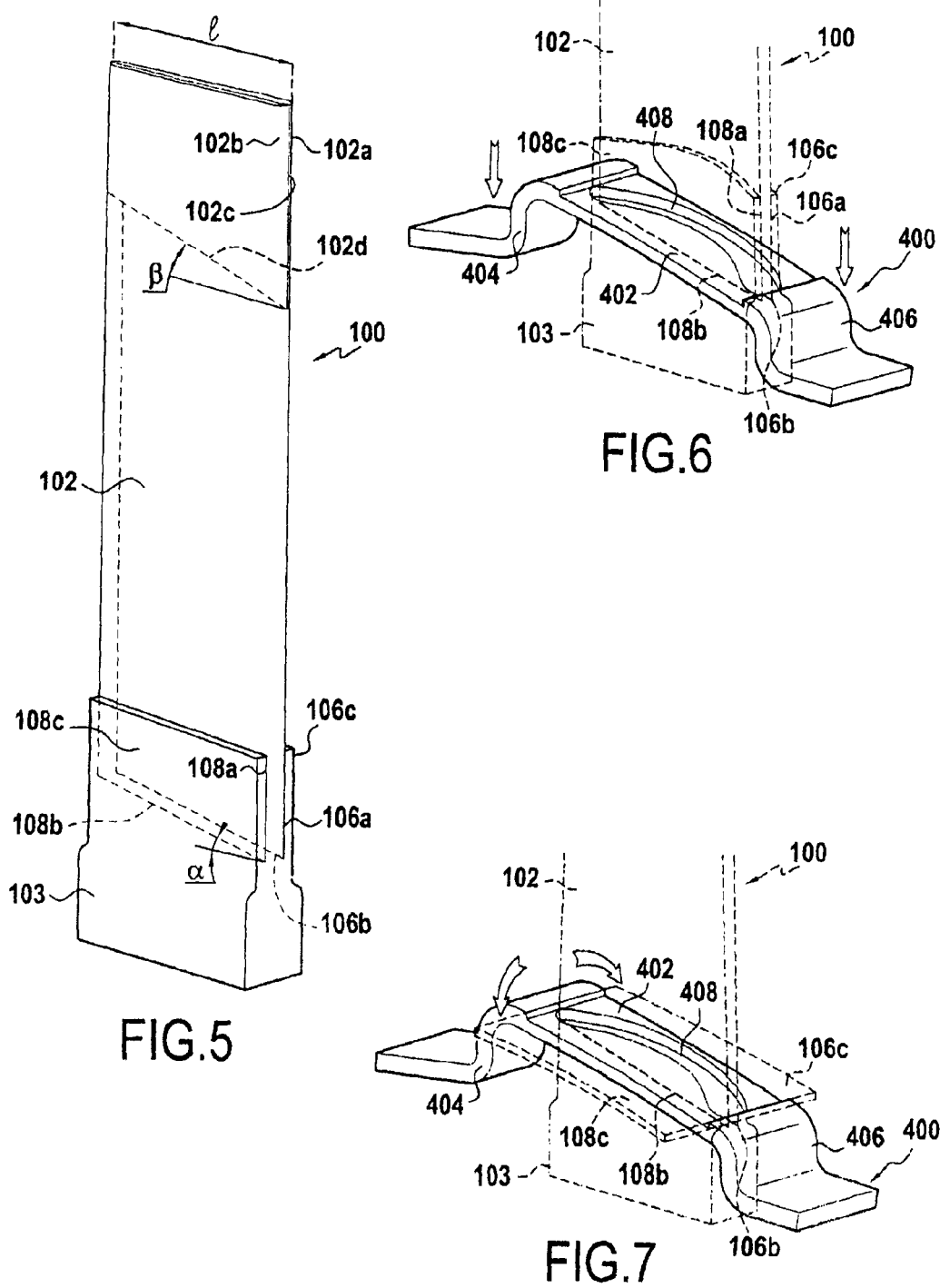

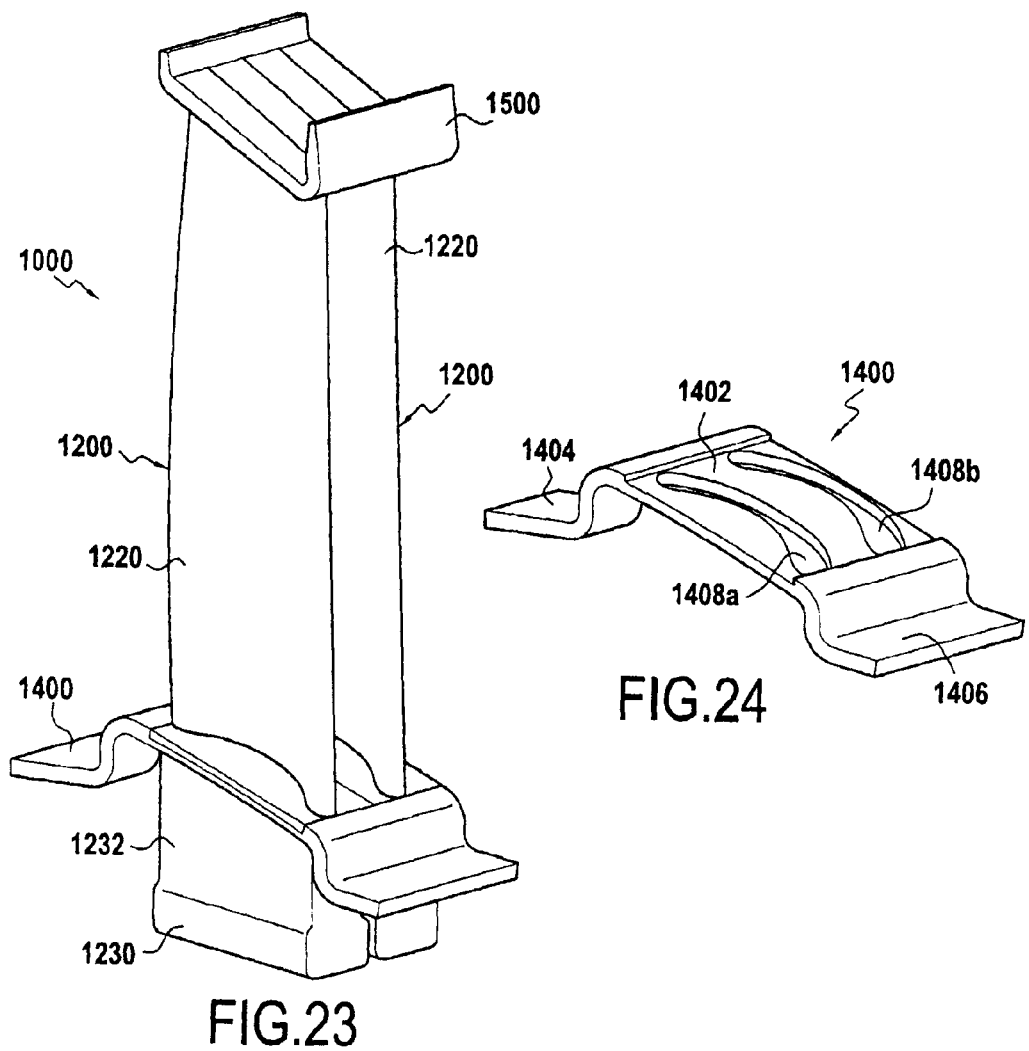
FIG.23
FIG.24
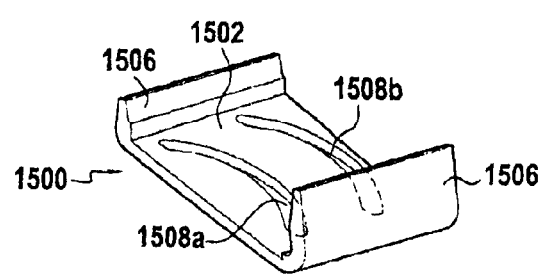
FIG.25

METHOD FOR PRODUCING A TURBOMACHINE BLADE MADE FROM A COMPOSITE MATERIAL

BACKGROUND OF THE INVENTION

The invention relates to fabricating composite-material turbomachine blades having a bottom and/or top platform incorporated therein.

The intended field is that of gas turbine blades for aeroengines or for industrial turbines.

Proposals have already been made to make composite material blades for turbomachines. By way of example, reference may be made to document EP 1 526 285, which describes fabricating a fan blade by making a fiber preform by three-dimensional weaving and by densifying the preform with a matrix.

Furthermore, in order to make structural parts of a turbomachine that are exposed to high temperatures in service, proposals have already been made to use thermostructural composite materials, and in particular ceramic matrix composite (CMC) materials. Compared with metal alloys, such materials can present improved high temperature performance and lower weight, while also having the mechanical properties needed for constituting structural parts. In particular for aeroengine gas turbines, it is desired to reduce weight and to reduce polluting emissions by increasing temperature.

Document EP 1 801 354 describes separately forming a preform for a blade airfoil and root and a preform for a platform by draping plies that are pre-impregnated with a resin and by partially polymerizing the resin. The platform preform has cheeks that are placed against opposite faces of the blade airfoil-and-root preform, over its root. After continuing polymerization, impregnation by a binder (silicon) is carried out in order to bond together the cheeks of the platform and the facing faces of the blade root.

The rigidification provided by the pre-polymerization restricts the complexity that it is possible to obtain in the shape of the airfoil profile.

OBJECT AND SUMMARY OF THE INVENTION

It is therefore desirable to have available turbomachine blades made of composite material, in particular of thermostructural composite material such as CMC, for the turbines or compressors of turbomachines, which blades present the required mechanical properties while presenting shapes that are relatively complex.

To this end, the present invention provides a method of fabricating a composite-material turbomachine blade having a bottom and/or top platform incorporated therein, the method comprising: separately making a blade platform element that comprises rigidified fiber reinforcement and that has a shape close to the shape of a platform of the blade that is to be fabricated, with at least one opening being formed through the platform element, the opening having the shape of the profile of the airfoil of the blade that is to be fabricated; engaging the platform element by means of its opening on a fiber reinforcement preform for an airfoil and a root of a blade; and assembling the platform element with the blade airfoil-and-root preform;

which method comprises the following steps:
using three-dimensional weaving to make a flexible fiber blank as a single piece that includes blade airfoil-and-root preform portions;
engaging the platform element via its opening on the flexible fiber blank while deforming it so as to assemble the platform element with the fiber blank;
shaping the fiber blank together with the platform element assembled thereon in order to obtain a blade preform of a shape that is close to the shape of the blade that is to be fabricated;
after shaping, consolidating the blade preform in its shape in a shaper; and
performing final densification of the consolidated blade preform in order to obtain a composite-material blade having an incorporated platform.

Advantageously, the blank is also made with deployable connection portions for superposing on and bonding to the platform element after it has been engaged. While weaving the blank, non-interlinked zones may be left to facilitate the deployment of the connection portions.

According to a feature of the method, the platform element is connected to the fiber blank either by stitching or pinning prior to inserting the matrix, or else by co-densification.

The preform may be consolidated by chemical vapor infiltration or by being impregnated with a consolidation composition containing a resin and then curing the resin. In the latter case, the blade may be impregnated before it is shaped.

Advantageously, a plurality of fiber blanks are woven in a continuous strip and individual blanks are cut out from the woven strip.

Also advantageously, a plurality of platform elements are cut from a section member that is obtained by shaping a plurality of bonded-together fiber layers and by rigidification.

The platform element is rigidified during an intermediate fabrication step. This may be done by chemical vapor infiltration or by impregnating with a rigidification composition that comprises a resin, and then curing the resin.

When the fiber blank is consolidated by being impregnated with a consolidation composition comprising a resin, and the platform element is rigidified by being impregnated with a rigidification composition containing a resin, the consolidation resin of the fiber blank and the rigidification resin of the platform element may be pyrolyzed simultaneously.

The method is applicable to fabricating a multi-airfoil blade, and for this purpose it comprises the steps of:
using three-dimensional weaving to make a plurality of fiber blanks as single pieces, each comprising respective blade airfoil-and-root preform portions;
separately making the bottom or top blade platform elements having a plurality of openings of airfoil profile shape; and
engaging the platform element via its openings simultaneously on the fiber blanks.

BRIEF DESCRIPTION OF THE DRAWINGS

The invention can be better understood on reading the following description given by way of non-limiting indication and with reference to the accompanying drawings, in which:

FIGS. 5 to 9 are diagrams showing the formation of a blade preform by assembling the FIG. 2 blank with the bottom and top platform elements of FIGS. 3 and 4;

FIG. 23 is a diagrammatic perspective view of a two-airfoil blade preform in another embodiment of the invention;

FIG. 24 is a diagrammatic perspective view of a bottom platform element for the FIG. 23 blade; and FIG. 25 is a diagrammatic perspective view of a top platform element for the FIG. 23 blade.

DETAILED DESCRIPTION OF EMBODIMENTS

Figure 1:
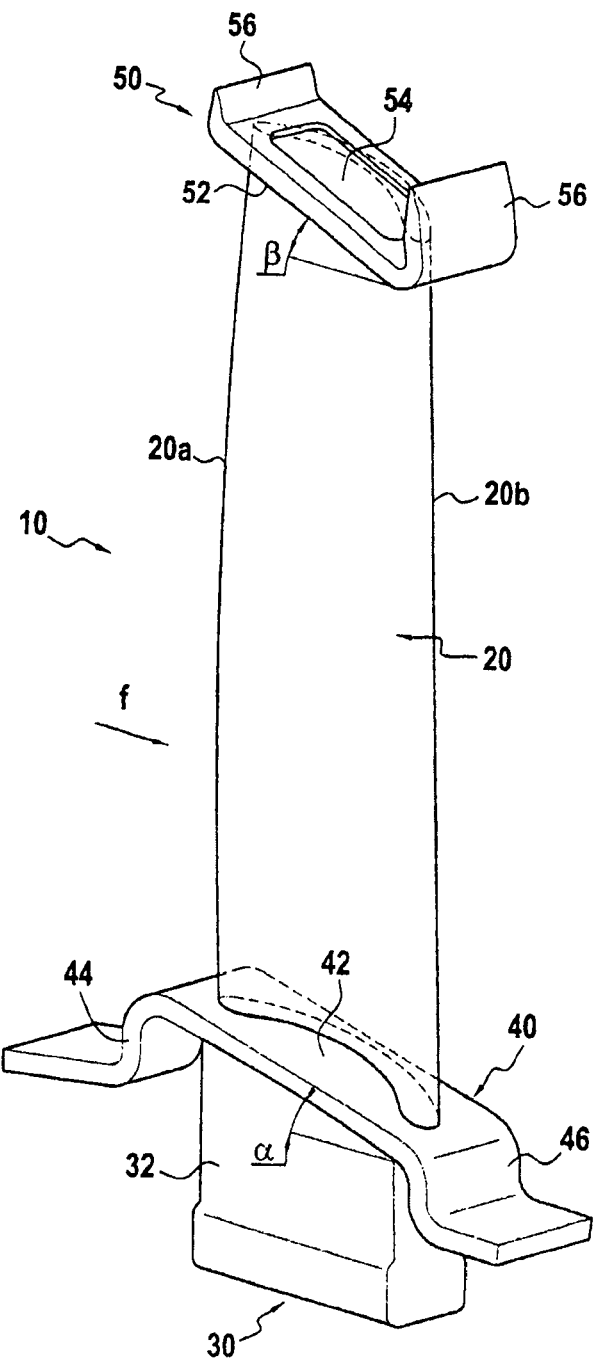
FIG. 1 is a perspective view of a turbomachine blade having bottom and top platforms incorporated therein.

The invention is applicable to various types of turbomachine blades having incorporated bottom and/or top platforms, in particular compressor blades and turbine blades of various gas turbine spools, e.g. a rotor blade for a low pressure (LP) turbine such as that shown in FIG. 1.

In well-known manner, the blade 10 of FIG. 1 comprises an airfoil 20, a root 30 made up of a portion of larger thickness, e.g. a root presenting a section in the shape of a bulb that is extended by a tang 32, a bottom platform 40 situated between the root 30 and the airfoil 20 and an outer or top platform 50 in the vicinity of the free end of the blade.

The blade 20 extends in a longitudinal direction between the bottom and top platforms 40 and 50 and presents, in cross-section, a curved profile of thickness that varies between its leading edge 20a and its trailing edge 20b.

The blade 10 is mounted on a turbine rotor (not shown) by engaging the root 30 in a housing of complementary shape formed in the periphery of the turbine rotor. The root is extended by the tang 32 so as to connect to the inner (or bottom) face of the bottom platform 40.

At its radially inner end, the airfoil 20 is connected to the bottom platform 40 at an outer (or top) face 42 of the platform that serves to define the inside of the flow passage for the stream of gas through the turbine. In its upstream and downstream end portions (upstream and downstream relative to the flow direction f of the gas stream), the bottom platform 40 is terminated by nibs 44 and 46. In the example shown, the face 42 of the turbine slopes, generally making a non-zero angle α relative to the plane that is normal to the longitudinal direction of the blade. Depending on the profile desired for the inner surface of the gas stream flow passage, the angle α might be zero, or the face 42 might have a profile that is not rectilinear, e.g. a profile that is curved.

At its radially outer end, the airfoil 20 is connected to the top platform 50 at its inner (or bottom) face 52 which defines the outside of the gas stream flow passage. On the outside (top) of the platform 50 there is a depression or "bathtub" 54. Along the downstream and upstream edges of the bathtub, the platform carries wipers 56 of tooth-shaped profile, with the tips thereof being suitable for penetrating into a layer of abradable material of a turbine ring (not shown) in order to reduce clearance between the tip of the blade and the turbine ring. In the example shown, the inside face 52 is inclined so as to generally form an angle β relative to a plane normal to the longitudinal direction of the blade. In a variant, depending on the profile desired for the outer surface of the gas stream flow passage, the face 52 could be substantially perpendicular to the longitudinal direction of the blade, or the face 52 could have a profile that is generally not rectilinear, e.g. a profile that is curved.

Figure 2:
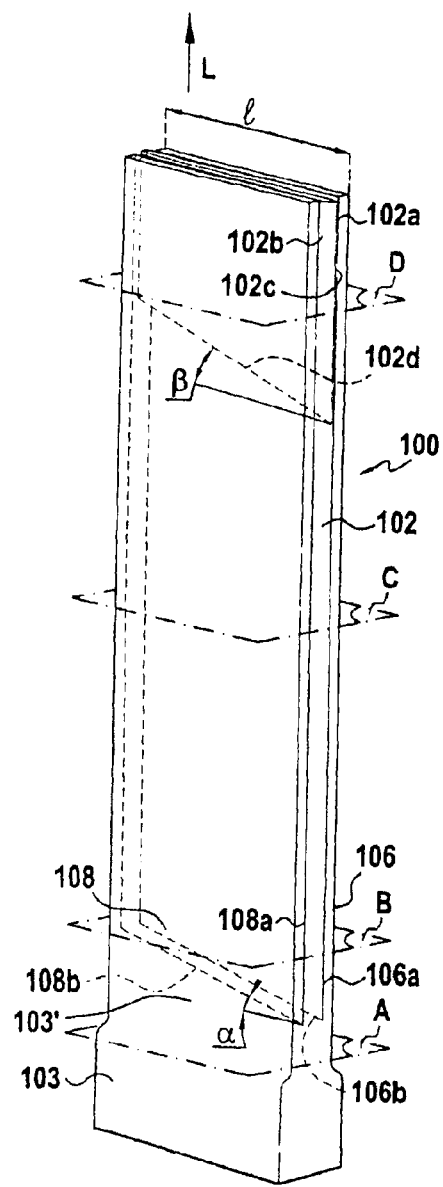
FIG. 2 is a diagrammatic perspective view of a fiber blank including an airfoil preform portion and a root preform portion for a blade.

FIG. 2 is a diagrammatic view of a fiber blank 100 from which it is possible to obtain a preform portion for a blade root and airfoil.

The airfoil blank 100 is obtained by multilayer three-dimensional weaving, as described below. The blank 100 extends generally in a direction L corresponding to the longitudinal direction of the blade that is to be made. In its portion 102 that is to form an airfoil preform, the blank 100 presents variable thickness that is determined as a function of the thickness of the profile of the airfoil of the blade that is to be made, and a width l that is selected as a function of the (flat) developed length of the profile of the airfoil and of the blade root that are to be made.

In its portion 103 that is to form a blade root preform, the blank 100 presents extra thickness that is determined as a function of the thickness of the blade root that is to be made.

The fiber blank 100 also includes lateral portions 106 and 108 that extend from the portion 103, on either side of the portion 102. Starting from a location that corresponds substantially to the location of the bottom platform of the blade and that extends to the outer end of the portion 102, the portions 106 and 108 are not connected to the portion 102, with non-interlinked zones 106a and 108a being provided during the weaving of the fiber blank. It should be observed that the non-interlinked zones start from lines 106b (drawn with dashes in FIG. 2) and 108b that form an angle α relative to a plane normal to the direction L. In a variant, the lines 106b and 108b could be curved.

Between the portion 103 of extra thickness and the lines 106b and 108b, the portions extending the portions 102, 106, and 108 are interlinked in order to form a portion 103' that is to form a blade tang preform.

The portion 102 also presents a non-interlinked zone 102c that separates its outer end portion into two flaps 102a and 102b. It should be observed that the non-interlinked zone 102c extends to the end of the portion 102 starting from a line 102d (drawn in dashes in FIG. 2) that is situated substantially at the location of the top platform of the blade and that, in the example shown, slopes to form an angle β relative to a plane normal to the direction L. In a variant, the line 102d could be curved.

Figure 3:
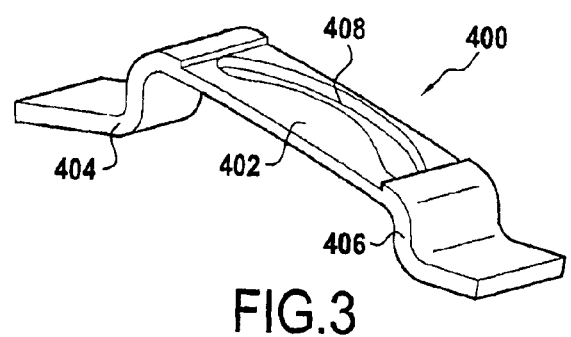
FIG. 3 is a diagrammatic perspective view on a larger scale of a rigidified element for a blade bottom platform.

FIG. 3 shows a bottom platform element 400 made up of fiber layers that are superposed and bonded together and made rigid in a particular shape, as described below. The platform element 400 substantially reproduces the shape of the bottom platform of the blade that is to be made, having a central portion 402 and end portions 404 and 406 that form nibs. The central portion 402 is of thickness that is small, less than that of the end portions 404 and 406. In the central portion 402, a through opening or slot 408 is formed that substantially reproduces the profile of the airfoil that is to be made, at the level of its connection with the bottom platform.

Figure 4:
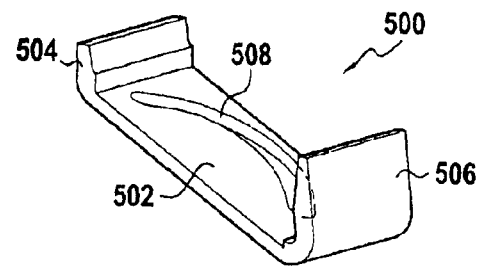
FIG. 4 is a diagrammatic perspective view on a larger scale of a rigidified element for a blade top platform.

FIG. 4 shows a top platform element 500 made up of superposed fiber layers that are bonded together and made rigid in a particular shape, as described below. The top platform element 500 substantially reproduces the U-shaped section shape of the top platform of the blade that is to be made, having a central portion 502 and raised end portions 506 that terminate in narrow ends. The central portion 502 is of reduced thickness which is less than that of the end portions 506. In the central portion 502, a through opening or slot 508 is formed that substantially reproduces the profile of the airfoil that is to be made, at the level of its connection with the top platform.

A blade preform is made by assembling the blank 100 with the platform elements 400 and 500, as shown in FIGS. 5 to 9.

The lateral portions 106 and 108 are cut to size so that only flaps 106c and 108c remain that extend over a limited distance from the lines 106b and 108b (FIG. 5).

The bottom platform element 400 is put into place by inserting the top end of the portion 102 of the blank 100 through the slot 408, with the blank 100 being deformed to match the profile of the slot 408. The bottom platform element 400 is then slid along the blank 100 until it reaches the start of the non-interlinked zones 106a and 108a, with the flaps 106c and 108c being engaged through the slot 408 which is dimensioned to make this possible (FIG. 6).

At this stage, the flaps 106c and 108c are deployed so as to be folded down against the outer (top) face of the central portion 402 of small thickness of the bottom platform element 400, the length and the thickness of the flaps being selected so as to obtain a bottom platform preform of thickness that is substantially constant (FIG. 7). The flaps 106c, 108c may then be bonded to the central portion 402 of the bottom platform element 400, e.g. by stitching or preferably by pinning (inserting rigid bonding elements), and the excess lengths of the flaps 106c and 108c are cut off. A bonding method by pinning is described in document U.S. Pat. No. 7,200,912.

Figure 8:
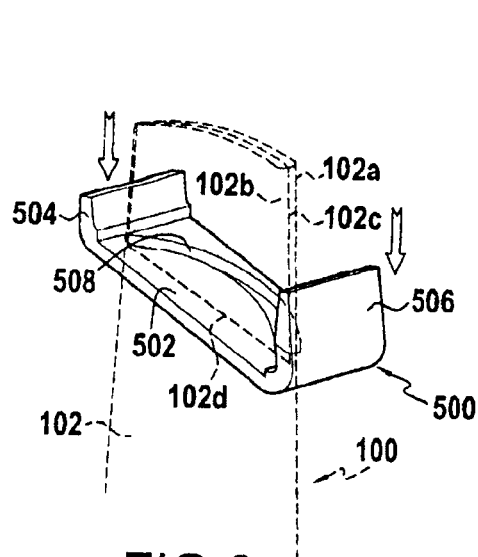

The top platform element 500 is put into place by inserting the outer end of the blank 100 through the slot 508 with the blank 100 being deformed so as to match the profile of the slot 508. The top platform element 500 is slid over the blank 100 down to the level of the bottom of the non-interlinked zone 102c (FIG. 8).

Figure 9:
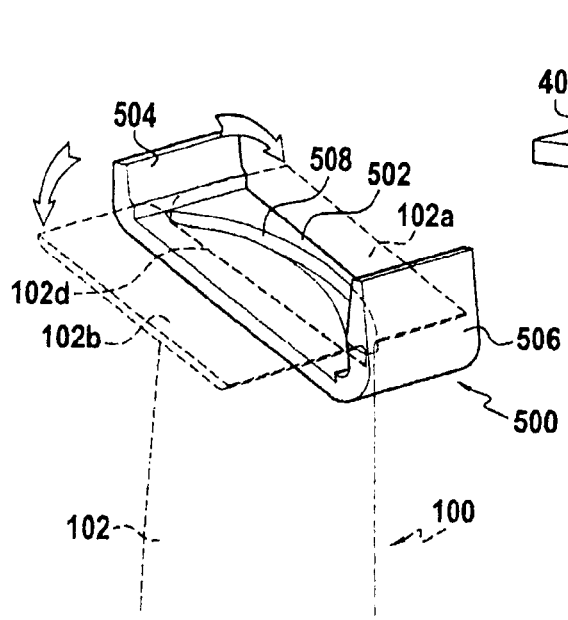
Figure 11A:
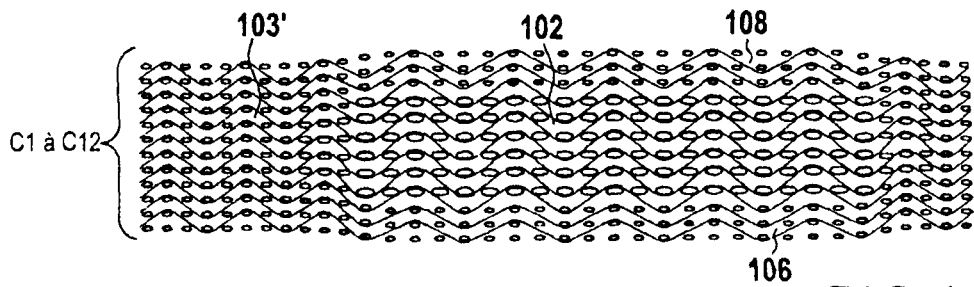
FIGS. 11A to 11D are cross-section views on a larger scale of the FIG. 2 fiber blank on various planes A, B, C, and D.
Figure 11B:
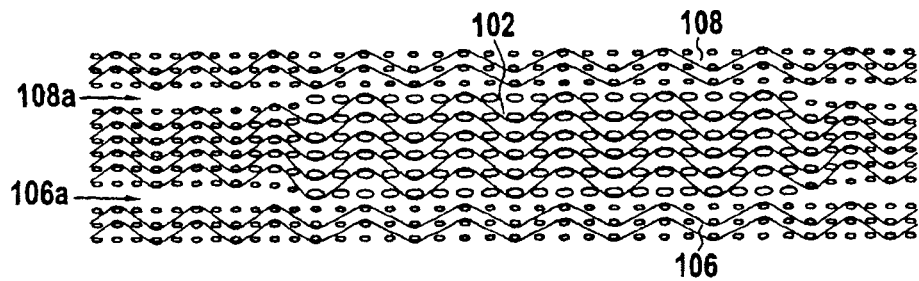
Figure 11C:
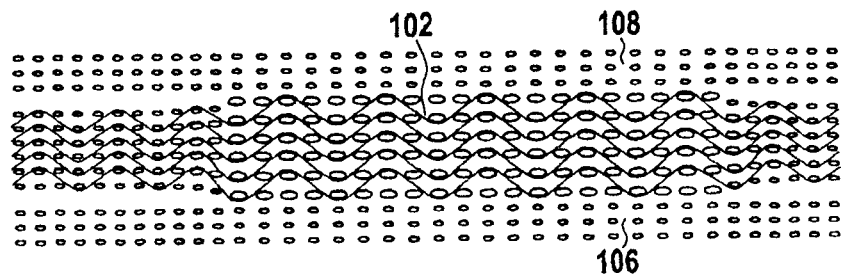
Figure 11D:
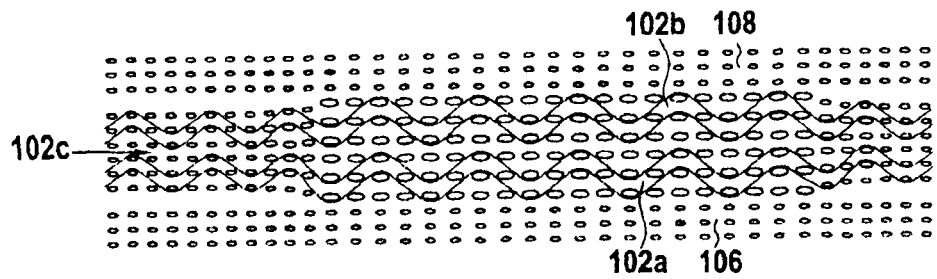

At this stage, the flaps 102a, 102b are deployed so as to be folded down against the outer (top) face of the central portion 502 of reduced thickness of the top platform element 500, so as to obtain a top platform preform of thickness that is substantially constant (FIG. 9). The flaps 102a, 102b can then be bonded to the central portion 502 of the top platform element 500, e.g. by stitching, or preferably by pinning, with the extra lengths of the flaps 102a and 102b being cut off.

Figure 10:
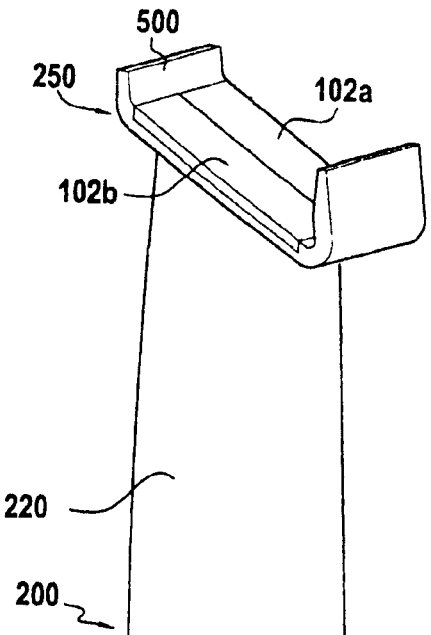
FIG. 10 is a very diagrammatic view of a blade preform.

This produces a blade preform 200 having preform portions for the airfoil 220, the root 230, and the tang 232 that are derived from the fiber blank 100, and bottom and top preform portions 240 and 250 that are formed by the platform elements 400 and 500 and by the flaps 106c, 108c and 102a, 102b (FIG. 10).

It should be observed that in a variant the platform elements 400 and 500 could merely be assembled on the blank 100 with actual bonding being obtained subsequently by co-densification while consolidating the blade preform or while densifying the blade preform by means of a matrix, as described below.

A method of three-dimensionally weaving the fiber blank 100 is described below in greater detail with reference to FIGS. 2 and 11A to 11D.

It is assumed that the weaving is performed with warp yarns that extend in the longitudinal direction L of the blank, it being understood that weaving with the weft yarns extending in this direction is also possible.

The variation in the thickness of the portion 102 of the blank 100 across its width in order to reproduce the profile of varying thickness of the airfoil, is obtained by using warp yarns of varying weights in the set of layers of warp yarns making up the portion 102 of the blank. In a variant, or in addition, it would also be possible to vary the thread count of the warp yarns (i.e. the number of yarns per unit length in the weft direction), a smaller count enabling greater thinning to be achieved while shaping the fiber blank.

In the example shown in FIGS. 11A to 11D, in order to obtain the desired airfoil profile, six layers of warp yarns of various weights are used in the portion 102. The yarns may have two different weights. In one embodiment, the yarns used may be yarns made essentially of silicon carbide (SiC) such as the yarns sold under the name "Nicalon" by the Japanese supplier Nippon Carbon having a weight of 0.5 K (500 filaments). The warp is then made up, for example, of 0.5 K yarns and of 1 K yarns obtained by uniting two 0.5 K yarns, the two yarns being united by wrapping. The wrapping is advantageously provided by a yarn of sacrificial nature suitable for being eliminated after weaving, e.g. a yarn made of polyvinyl alcohol (PVA) that can be eliminated by being dissolved in water.

Still in the example shown, for each of the lateral portions 106 and 108, a set of three layers of warp yarns is used, thereby bringing the total number of layers of warp yarns to 12.

Naturally, the numbers of layers of warp yarns for the portions 102, 106, and 108 may be other than those stated here, depending in particular on the weights of the yarns used and on the desired thicknesses.

In the portion 103' corresponding to the tang of the blade that is to be made (FIG. 11A), all of the layers of warp yarns c1 to c12 are interlinked by weft yarns, e.g. by interlock type weaving. The term "interlock weaving" is used herein to mean a weave in which each layer of weft yarns links together a plurality of layers of warp yarns (two in the example shown), with all of the yarns in a given weft column having the same movement in the weave plane.

In the portion corresponding to the zone of the blank that includes the flaps 106c and 108c (FIG. 11B), the layers of warp yarns in the airfoil portion 102 are linked together by weft yarns using interlock weaving, the layers of warp yarns for the lateral portion 106 are linked together by weft yarns by interlock weaving, and the layers of warp yarns in the lateral portion 108 are linked together by weft yarns by interlock weaving. In contrast, the weft yarns do not link together the layers of warp yarns in the portion 102 with the layers of warp yarns in the portion 106, and likewise the layers of warp yarns in the portion 102 are not linked with the layers of warp yarns in the portion 108, thereby obtaining the zones 106a and 108a with no interlinking.

The angle of inclination α of the bottom or origin lines for the non-interlinked zones 106a and 108a, or the curved shape of these lines, are obtained by causing the position of the origin to vary in the set of warp planes.

In the portion corresponding to the portion 102 of the blank 100 that does not lie between the flaps 106c and 108c (FIG. 11C), the weaving of the two sets of warp yarns in the lateral portions 106 and 108 is preferably omitted (no weft yarns are inserted).

In the portion corresponding to the outer end of the portion 102 of the blank 100 (FIG. 11D), the set of layers of warp yarns forming the portion 102 is split into two subsets that are not linked together in order to provide the non-interlinked zone 102c between the flaps 102a and 102b. The angle of inclination β of the bottom or origin line of the non-interlinked zone 102c or a curved shape for said line is obtained by varying the position of the origin in this set of warp planes.

Although interlock type three-dimensional weaving is mentioned above, other multilayer weaving methods may be adopted, for example a multi-satin weave or a multi-plain weave, as described in document WO 2006/136755.

Figure 12:
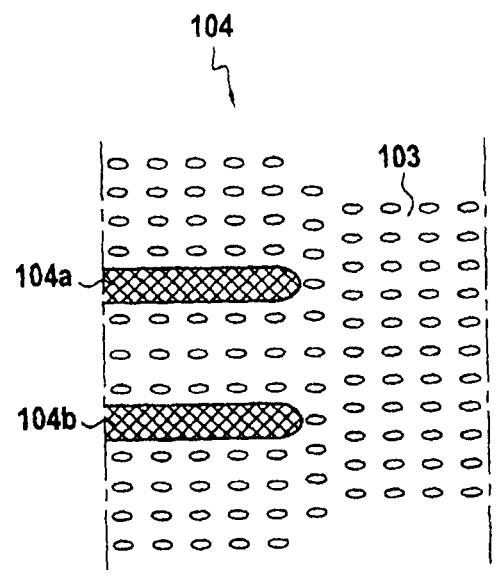
FIG. 12 is a weft section view showing an embodiment of the portion of the FIG. 2 fiber blank that corresponds to a blade root preform portion.

In an embodiment shown in FIG. 12 (where only the weft yarns seen in section are shown), the extra thickness 104 is obtained by placing inserts 104a and 104b between the layers of weft yarns that are not interlinked in this location after weaving. Naturally, it would also be possible to use only one insert or more than two inserts. The inserts may be constituted by monolithic ceramic blocks, e.g. blocks of SiC, obtained by sintering SiC powder. The inserts may be held in their desired locations in the fiber blank by the woven texture of the blank or by the mold or shaper that is used subsequently for obtaining a blade preform, as described below.

Figure 13:
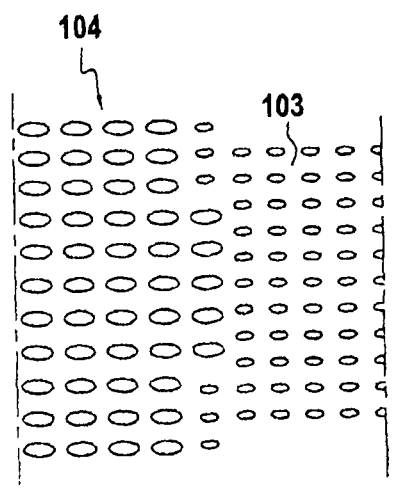
FIG. 13 is a weft section view showing another embodiment of the portion of the FIG. 2 fiber blank that corresponds to a blade root preform portion.

In another embodiment that is shown in FIG. 13 (where only the weft yarns in section are shown) the extra thickness 104 is obtained by using weft yarns of greater weight. For a blank woven using essentially SiC yarns such as 0.5 K yarns from the supplier Nippon Carbon under the name "Nicalon", yarns of greater weight may be obtained by uniting a plurality of 0.5 K yarns by wrapping, as described above.

Figure 14:
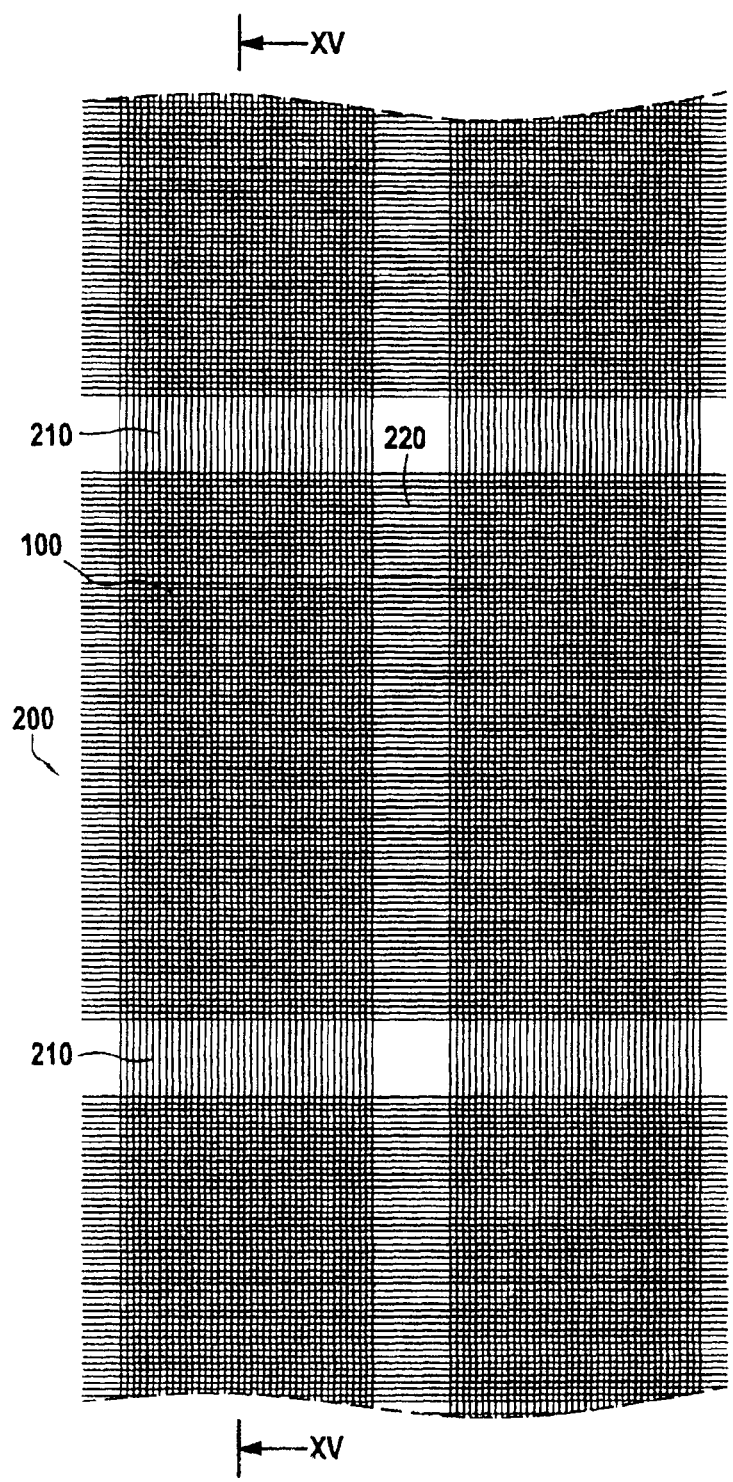
FIG. 14 is a very diagrammatic view of an embodiment of a continuous woven strip obtained by three-dimensional weaving and comprising a plurality of fiber blanks such as that shown in FIG. 2.
Figure 15:
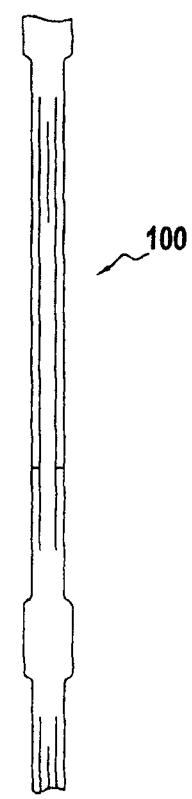
FIG. 15 is a highly diagrammatic fragmentary section view on plane XV of FIG. 14.

As shown very diagrammatically in FIGS. 14 and 15, a plurality of fiber blanks 100 may be obtained by weaving a strip 200 having one or more rows of fiber blanks formed successively therein. Extra length zones 210, 220 are formed in the warp direction (comprising warp yarns only) and in the weft direction (comprising only weft yarns) in order to avoid edge phenomena associated with weaving, in order to allow greater freedom in deformation while the preform is being shaped, and in order to provide transition zones between blanks 100.

Figure 16:
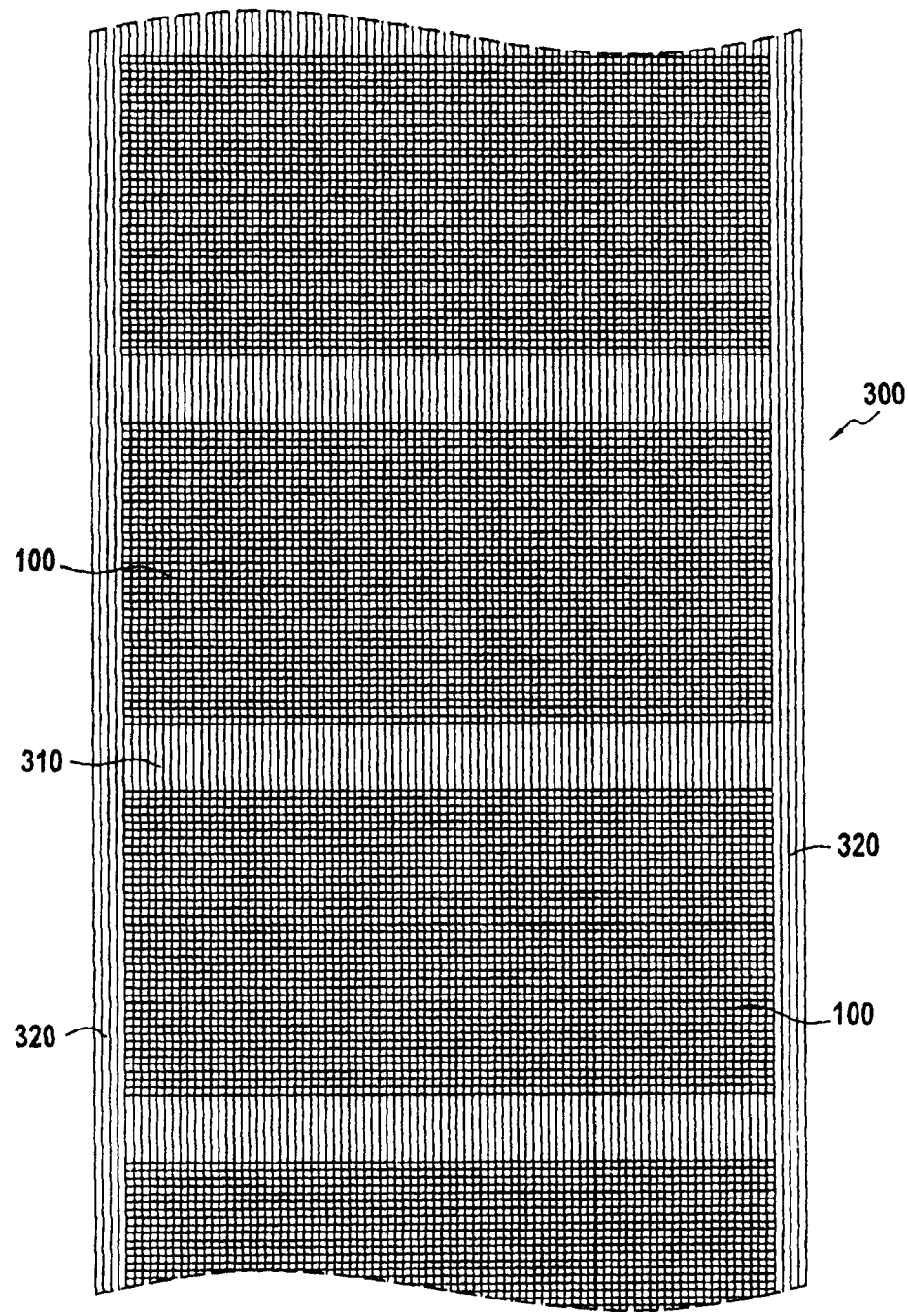
FIG. 16 is a highly diagrammatic view of another embodiment of a continuous woven strip obtained by three-dimensional weaving and comprising a plurality of fiber blanks such as that shown in FIG. 2.

FIG. 16 shows a variant embodiment in which a strip 300 is made having a row of blanks 100 woven in the weft direction perpendicularly to the longitudinal direction of the strip. Extra length zones 310, 320 are likewise provided in the warp direction and in the weft direction. A plurality of rows of blanks 100 may be woven, with the width of the strip 300 being adapted for this purpose.

Advantageously, a plurality of platform elements 400 are obtained by cutting a rigidified fiber section member into segments, with openings or slots 408 being formed therein.

Figure 17:
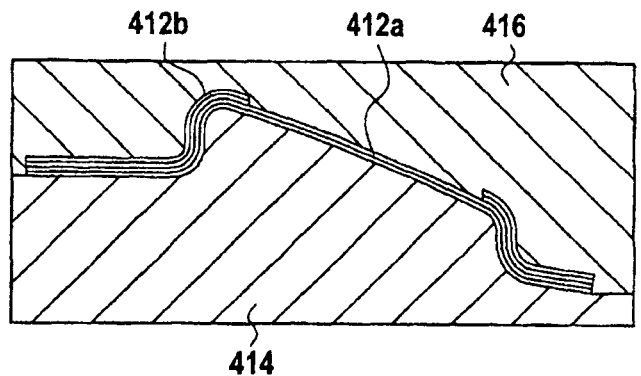
FIG. 17 is a diagrammatic section view showing how a fiber section member is made in order to obtain bottom platform elements such as that shown in FIG. 3.

A fiber section member 410 is obtained by superposing and shaping fiber plies (FIG. 17). A plurality of fiber plies 412a extend over the entire length of the profile, whereas other plies 412b extend over a portion only of the length of the profile so as to leave a central portion of smaller thickness corresponding to the portions 402 of the platform elements.

The plies 412a and 412b may for example be layers of fabric obtained by three-dimensional (3D) or multi-layer weaving. It is possible to use 3D fabric based on an interlock weave, or a multi-satin weave, or a multi-plain weave, as described in particular in document WO 2006/136755.

The superposed and shaped plies of 3D fabric are preferably bonded together, e.g. by stitching or by pinning.

The plies are shaped by being draped onto a former 414 serving to impart the desired profile, and the section member may be held in the desired shape while it is being rigidified by partial densification in the manner described below by placing a fiber section member 410 between the former 414 and a backing mold 416.

Similarly, a plurality of top platform elements 500 are advantageously obtained by cutting up a rigidified fiber section member into segments in which openings or slots 508 are formed.

Figure 18:
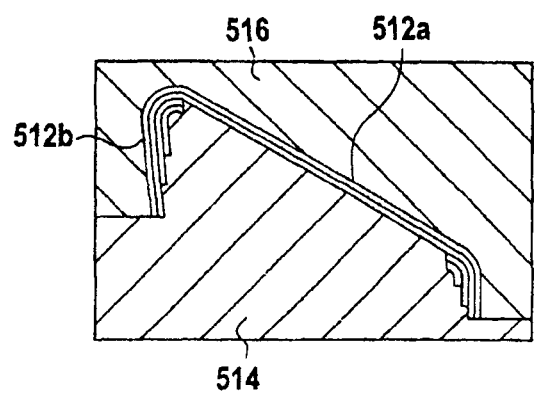
FIG. 18 is a diagrammatic section view showing how a fiber section member is made in order to obtain top platform elements such as that shown in FIG. 4.

A fiber section member 510 is obtained by superposing and shaping fiber plies (FIG. 18). A plurality of plies 512a extend over the entire length of the profile, while other plies 512b extend over a portion only of the length of the profile in order to leave a central portion of small thickness corresponding to the portions 502 of the platform elements.

The plies 512a and 512b may be 3D fabric layers optionally bonded together after shaping as described above for the plies 412a and 412b.

Shaping is performed by draping onto a former 514 and the shape is maintained while the section member is being rigidified by interposing it between the former 514 and a backing mold 516.

Figure 19:
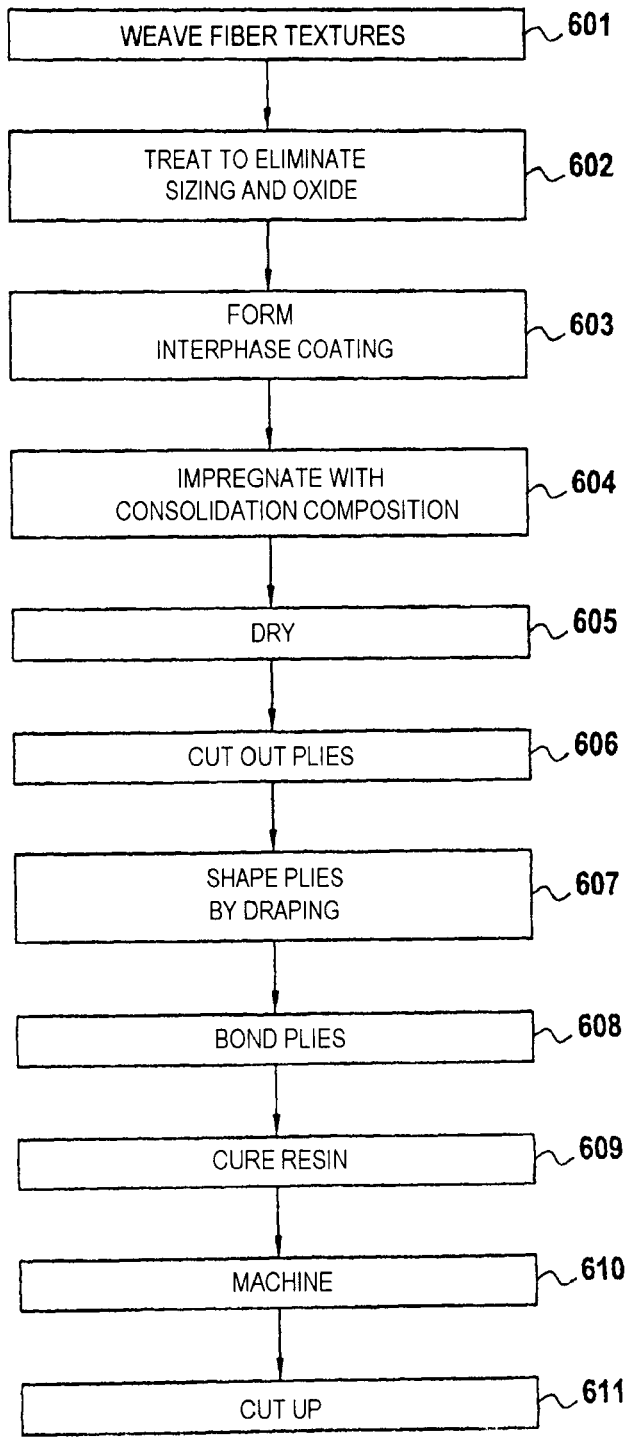
FIG. 19 shows the successive steps in a method of making a platform element such as that shown in FIG. 3 or FIG. 4.

Successive steps of a method of fabricating platform elements 400 or 500 are shown in FIG. 19.

In step 601, fiber textures are obtained by 3D weaving. For an application to a turbomachine blade that is to be used at high temperature, and more particularly in a corrosive environment (in particular a wet environment), the weaving is performed using yarns made of ceramic fibers, in particular SiC fibers.

In step 602, the woven fiber textures are treated to eliminate the sizing present on the fibers and the presence of oxide on the surface of the fibers. Oxide is eliminated by acid treatment, in particular by immersion in a bath of hydrofluoric acid. If the sizing cannot be eliminated by the acid treatment, prior sizing-eliminating treatment is performed, e.g. short heat treatment for decomposing the sizing.

A thin layer of interphase coating is formed on the fibers of the fiber textures by chemical vapor infiltration (CVI) in a manner that is itself known (step 603). By way of example, the interphase coating material is pyrolytic carbon (PyC), boron nitride BN, or boron-doped carbon (BC including, for example, 5% at to 20% at of B, with the balance being C). The interphase coating is of thickness that is selected to be sufficiently small to preserve good capacity for deformation, e.g. no greater than 100 nanometers or indeed no greater than 50 nanometers.

In step 604, the fiber plies are impregnated with a rigidification composition, typically a resin diluted in a solvent. It is possible to use a carbon-precursor resin, e.g. a phenolic or a furanic resin, or a ceramic-precursor resin, e.g. a polysilazane or a polysiloxane resin, precursor of SiC.

After drying (step 605), the plies are cut (step 606) and the cut plies are shaped by being draped on a former (step 607) and they are optionally bonded together by stitching or pinning (step 608).

The impregnated fiber section member is held in shape between the draping former and the backing mold, and heat treatment is applied to cure and pyrolize the resin (step 609). The quantity of resin is selected so as to achieve partial densification serving to rigidify the fiber section member while leaving significant residual porosity, i.e. without completely densifying the fiber section member.

In step 610, machining is performed serving to bring the rigidified section member to the desired dimensions. In addition, the slots are formed, e.g. by machining using a jet of water under pressure.

In step 611, the platform elements are obtained by cutting up the rigidified section member.

It should be observed that the slots may be formed after the platform elements have been cut apart rather than being formed in the rigidified section member.

Successive steps of another method of fabricating a platform element are described with reference to FIG. 20.

After steps 701 and 702 of weaving fiber textures and eliminating sizing and oxide, similar to steps 601 and 602, the plies are cut from the woven fiber textures (step 703).

The cut plies are shaped by draping on a former (step 704) and they are bonded together by stitching or pinning (step 705), thereby forming a fiber section member.

The fiber section member is held in shape between the draping former and a backing mold, and an embrittlement relief interphase coating is formed on the fibers (step 706). In well-known manner, such an interphase coating protects the fibers against cracks propagating through the composite material as finally obtained. By way of example, the interphase coating material may for example be pyrolytic carbon (PyC), boron nitride (BN), or boron-doped carbon (BC) as mentioned above. By way of example, the interphase coating is formed by CVI. For this purpose, the former and the backing mold used for shaping and holding the fiber section member in shape are preferably made of graphite and are provided with holes to facilitate passing the reaction gas that leads to the interphase material being deposited. The thickness of the interphase coating is a few tens of nanometers to a few hundreds of nanometers.

Thereafter (step 707), rigidification is performed by partial densification by forming a matrix by CVI. In the intended application to a turbine blade, the matrix is preferably a ceramic matrix, e.g. of SiC. Forming an SiC matrix by CVI is well known. Partial densification is performed sufficiently to ensure that the fiber section member is sufficiently rigid to be handled and to be subjected to machining operations, while nevertheless leaving significant residual porosity.

Thereafter, steps of machining (step 708) and of cutting up (step 709) the rigidified fiber section member are performed as described above with reference to steps 610 and 611 in FIG. 19.

Successive steps of a method of making a turbine blade in an implementation of the invention are described below with reference to FIG. 21.

In step 801, a continuous fiber strip is woven by three-dimensional weaving so as to comprise a plurality of fiber blanks, e.g. several rows of fiber blanks extending in the warp direction as shown in FIG. 14 or 15. For turbine blades that are for use at high temperature, in particular in a corrosive environment, the weaving is performed using yarns made of ceramic fibers, e.g. SiC yarns.

In step 802, the fiber strip is treated to eliminate the sizing present on the fibers and to eliminate the presence of oxide on the surface of the fibers, in the same manner as in step 602 of FIG. 19.

In step 803, a thin layer of interphase coating is formed on the fibers of the fiber strip by CVI. By way of example, the material of the interphase coating is PyC, BN, or BC. The thin layer of interphase coating is preferably of small thickness, e.g. no greater than 100 nanometers, or indeed no greater than 50 nanometers, so as to conserve good capacity for deformation in the fiber blanks. The thickness is preferably not less than 10 nanometers.

In step 804, the fiber strip with its fibers coated in a thin layer of interphase coating is impregnated with a consolidation composition, typically a resin possibly diluted in a solvent. It is possible to use a carbon-precursor resin, e.g. a phenolic resin or a furanic resin, or a ceramic-precursor resin, e.g. a polysilazane resin or a polysiloxane resin as a precursor for SiC.

After drying by eliminating any resin solvent (step 805), the individual fiber blanks are cut apart (step 806).

In steps 807 and 808, bottom and top platform elements are put into place on the blank. The blank provided with the bottom and top platform elements is shaped in a mold or shaper so as to obtain a blade preform having bottom and top platforms incorporated therein (step 809).

Thereafter, the resin is cured (step 810) and the cured resin is pyrolized (step 811). Curing and pyrolysis may follow on one after the another by progressively raising the temperature while the preform is held in the shaper. Once the platform elements have been rigidified by being impregnated by a composition containing a resin and by curing the resin, the rigidification resin is pyrolized at the same time as the consolidation resin of the shaped blank is pyrolized.

After pyrolysis, a fiber preform is obtained that is consolidated by the pyrolysis residue, which preform is removed from the shaper. The quantity of consolidation resin is selected so that the pyrolysis residue bonds together the fibers of the preform sufficiently to enable the preform to be handled while retaining its shape without assistance from tooling, it being understood that the quantity of consolidation resin is preferably selected to be as little as possible.

As mentioned above, effective bonding between the platform elements and the blanks on which they are assembled can be performed only at this stage of consolidation by partial co-densification by means of the residue of resin pyrolysis.

A second interphase layer is formed by CVI (step 812) in order to obtain an overall fiber-matrix interphase that is of thickness that is sufficient to perform its embrittlement relief function in the composite material. The second interphase layer may be made of a material selected from PyC, BN, and BC, which need not necessarily be the same material as is used for the first interphase layer. The thickness of the second interphase layer is preferably not less than 100 nanometers.

The use of an interphase made of two layers, as described above, is preferred. It is described in the French patent application filed under No. 08/54937 by the Applicant.

Densification of the consolidated preform by means of a matrix is then performed by CVI, in which case the forming of the second interphase layer and the densification by means of a matrix may follow on one after the other in the same oven.

Densification may be performed in two successive steps (steps 813 and 815) that are separated by a step 814 of machining the blade to the desired dimensions. The second densification step thus serves to coat any fibers that might have been laid bare during the machining.

Figure 22:
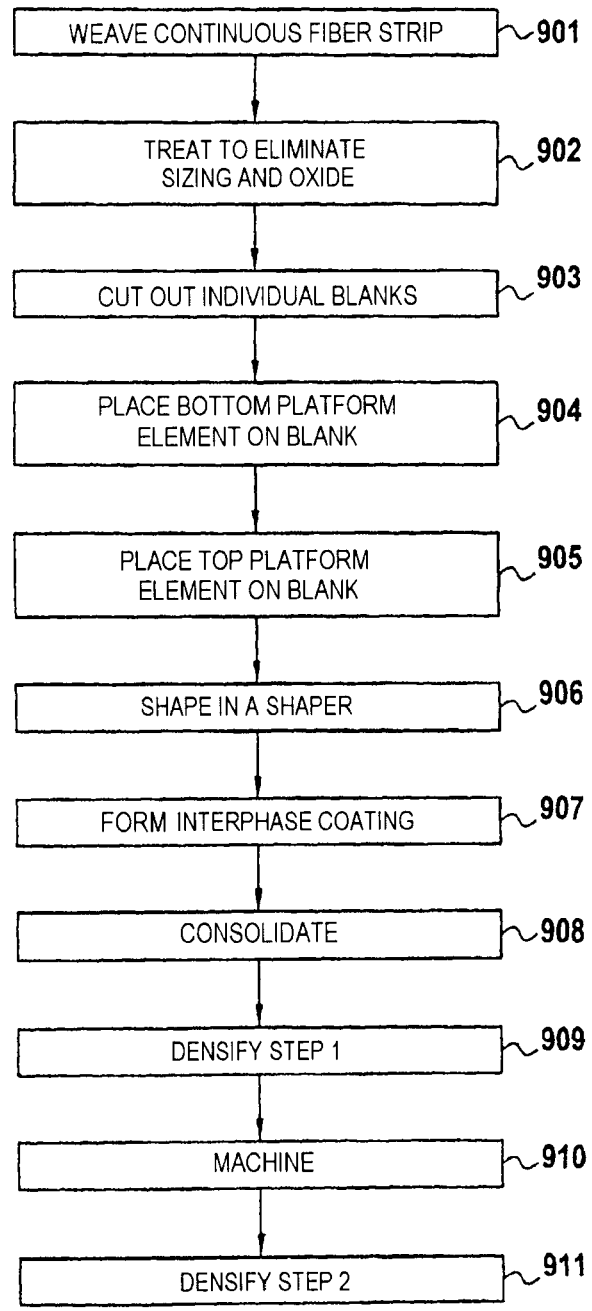
FIG. 22 shows the successive steps of another method of making a turbomachine blade in accordance with the invention.

Successive steps of making a turbine blade in another implementation of the invention are described below with reference to FIG. 22.

Figure 20:
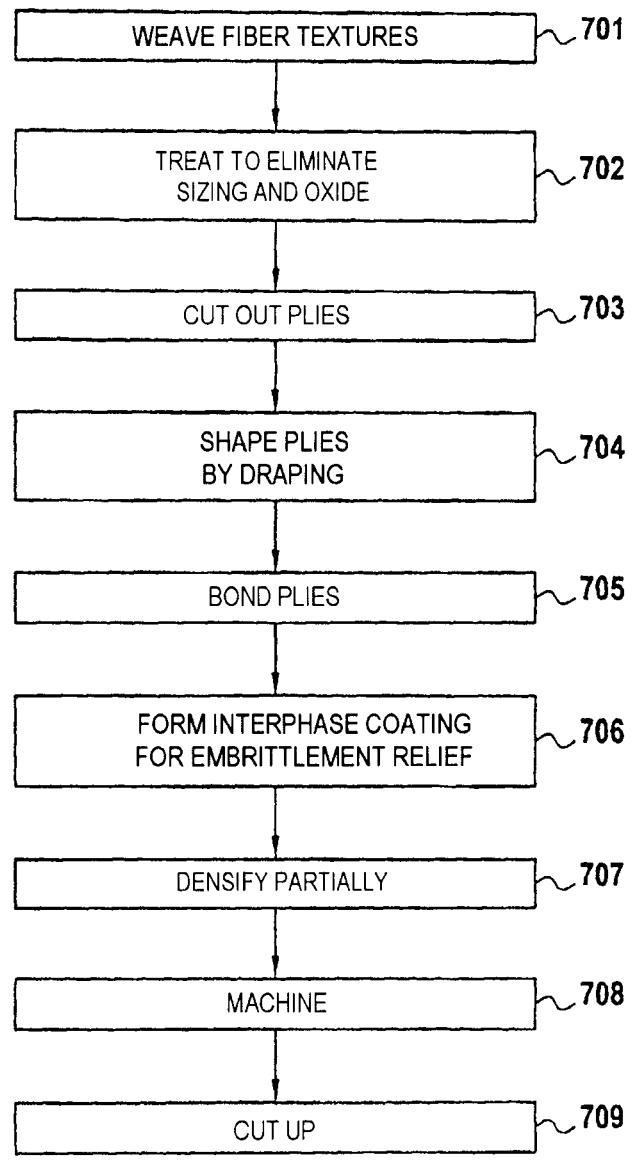
FIG. 20 shows the successive steps of another method of making a platform element such as that shown in FIG. 3 or FIG. 4.

Step 901 of weaving a fiber strip and step 902 of treating the fibers to eliminate sizing and oxide are analogous to the steps 801 and 802 of the method of FIG. 20.

In step 903, individual fiber blanks are cut from the fiber strip.

A bottom platform element 400 is put into place on each cut-out fiber blank 100 in the manner described with reference to FIGS. 6 and 7 (step 904).

Thereafter, a top platform element 500 is put into place as described with reference to FIGS. 8 and 9 (step 905).

The blank 100 fitted with its bottom and top platform elements is shaped in a mold or shaper (step 906) in order to obtain a preform blank having incorporated bottom and top platforms.

In step 907, an embrittlement relief interphase coating is formed by CVI on the fibers of the shaped blank. By way of example, the material of the interphase coating is PyC, BN, or BC, as mentioned above. The thickness of the interphase coating is a few tens of nanometers to a few hundreds of nanometers.

With the preform still held in shape in the shaper, the preform is consolidated by partial densification (step 908), with consolidation being performed by forming a ceramic deposit on the fibers by CVI, e.g. a deposit of SiC. In order to form the coating and to perform consolidation by CVI, the shaper is preferably made of graphite and presents holes facilitating the passage of the reaction gas that gives rise to the ceramic being deposited by CVI.

In the same manner as described above, effective bonding between the platform elements and the blank can be performed by partial co-densification during the consolidation stage.

Once consolidation is sufficient to enable the preform to be handled while conserving its shape without assistance from support tooling, the consolidated preform is extracted from the shaper and it is densified with a ceramic matrix (e.g. of SiC) by CVI. The densification may be performed in two successive steps (steps 909 and 911) that are separated by a step 910 of machining the blade to the desired dimension.

Figure 21:
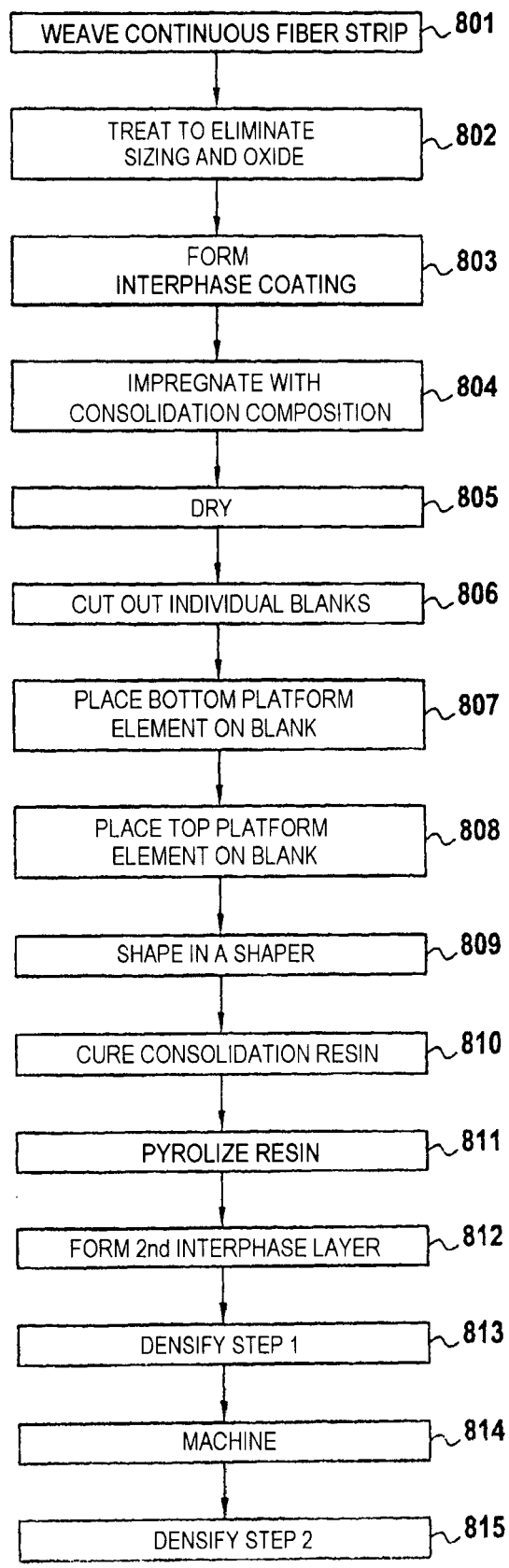
FIG. 21 shows the successive steps of a method of making a turbomachine blade in accordance with the invention.

In the implementations of FIGS. 20 and 21, the purpose of the machining is to give the desired profile to the airfoil of the blade and to give the desired shapes to the bottom and top platforms (and in particular to the wipers and the bathtub of the top platform). It should be observed that pre-machining of the platform elements may be performed at the rigidified stage, on the platform elements or on the rigidified section members, before they are cut up.

It should be observed that in the above-described embodiments, densification of the preform by CVI and similarly rigidification of the platform elements may be performed using a matrix other than SiC, in particular a carbon matrix or a self-healing matrix, with examples of self-healing matrix phases being a ternary Si—B—C system or boron carbide $B_4C$. Reference may be made to documents U.S. Pat. No. 5,246,736 and U.S. Pat. No. 5,965,266, which describes how such self-healing matrices can be obtained by CVI.

In the above detailed description, a single-airfoil blade is obtained. Nevertheless, the invention is applicable to making blades having a plurality of airfoils, e.g. two-airfoil blades or doublets.

FIG. 23 shows a preform 1000 for a two-airfoil blade comprising two similar preform elements 1200 each having an airfoil preform portion 1220, a root preform portion 1230, and a tang preform portion 1232. The preform portions 1220, 1230, and 1232 are similar to the preform portions 220, 230, and 232 of FIG. 10, it being possible for the preform elements 1200 to be made using fiber blanks such as the blank 100 described above.

The preform 1000 also includes a bottom platform element 1400 (FIG. 24) made up of superposed fiber layers that are bonded together and rigidified in shape in the same manner as the above-described bottom platform element 400. The bottom platform element 1400 substantially reproduces the shape of the common bottom platform of the two-airfoil blade that is to be made, having a central portion 1402 and end portions 1404 and 1406 forming nibs. The central portion 1402 presents small thickness, less than that of the end portions 1404 and 1406. In the central portion 1402, two through openings or slots 1408a and 1408b are formed that substantially reproduce the profile of the airfoils of the blade that is to be made where they join the top platform.

The preform 1000 also includes a top platform element 1500 (FIG. 25) made up of fiber layers that are superposed and bonded together, and that are rigidified in shape in the same manner as the top platform element 500 described above. The platform element 1500 substantially reproduces the U-shaped section shape of the common top platform for the two-airfoil blade that is to be fabricated, having a central portion 1502 and raised end portions 1506. The central portion 1502 is of small thickness and presents two through openings or slots 1508a and 1508b that substantially reproduce the profile of the airfoils of the blade that is to be made where they join the top platform.

The platform elements 1400 and 1500 are put into place on the preform elements 1200 and assembled thereto in a manner similar to that described above for the elements 400 and 500.

This two-airfoil blade embodiment thus differs from the single-airfoil blade embodiment essentially by using single-piece bottom and top platform elements that are common to both airfoils.

The invention claimed is:

1. A method of fabricating a composite-material turbomachine blade having a bottom or top platform incorporated therein, the method comprising:

separately making a blade platform element that comprises rigidified fiber reinforcement and that has a shape close to the shape of a platform of the blade that is to be fabricated, with at least one opening being formed through the platform element, the opening having the shape of the profile of the airfoil of the blade that is to be fabricated;

using three-dimensional weaving to make a flexible fiber blank as a single piece that includes blade airfoil-and-root preform portions;

engaging the platform element on the flexible fiber blank via the opening of the platform element while deforming the fiber blank to match a profile of the opening so as to assemble the platform element with the fiber blank;

shaping the fiber blank together with the platform element assembled thereon in order to obtain a blade preform of a shape that is close to the shape of the blade that is to be fabricated;

after shaping, consolidating the blade preform in its shape in a shaper; and performing final densification of the consolidated blade preform in order to obtain a composite-material blade having an incorporated platform.

2. The method according to claim 1, wherein the fiber blank includes deployable connection portions which are superimposed on and bonded to an upper surface of the platform element after the fiber blank has been engaged with the platform element.

3. The method according to claim 2, wherein while weaving the blank, non-interlinked zones are provided to facilitate the deployment of the connection portions.

4. The method according to claim 1, wherein the connection of the platform element with the fiber blank is performed by stitching, pinning, or co-densification.

5. The method according to claim 1, wherein the consolidating of the blade preform is by chemical vapor infiltration.

6. The method according to claim 1, wherein the consolidating comprises impregnating with a consolidation composition containing a resin, and then curing the resin after shaping.

7. The method according to claim 6, wherein the impregnating is performed on the blank prior to shaping.

8. The method according to claim 6, wherein the platform element is rigidified by impregnating with a rigidification composition comprising a resin and then curing the resin, and the consolidation resin of the fiber blank and the rigidification resin of the platform element are pyrolized simultaneously.

9. The method according to claim 1, wherein a plurality of fiber blanks are woven in a continuous strip and individual blanks are cut out from the woven strip.

10. The method according to claim 1, wherein a plurality of platform elements are cut from a section member that is obtained by shaping a plurality of bonded-together fiber layers and by rigidification.

11. The method according to claim 1, wherein the platform element is rigidified by chemical vapor infiltration.

12. The method according to claim 1, wherein the platform element is rigidified by impregnation with a rigidification composition comprising a resin, followed by curing the resin.

13. The method according to claim 2, wherein the upper surface of the platform element includes a central portion and end portions, a thickness of the central portion being less than a thickness of the end portions.

14. A method of fabricating a composite-material turbomachine blade having a bottom or top platform incorporated therein, the method comprising:
    separately making a bottom or top blade platform element that comprises rigidified fiber reinforcement and that has a shape close to the shape of a platform of the blade that is to be fabricated, with a plurality of openings being formed through the platform element, the openings having the shape of the profile of the airfoil of the blade that is to be fabricated;
    using three-dimensional weaving to make a plurality of fiber blanks as single pieces, each comprising respective blade airfoil-and-root preform portions;
    engaging the platform element simultaneously on the flexible fiber blanks via the openings of the platform element while deforming the fiber blanks to match the profile of the openings so as to assemble the platform element with the fiber blanks;
    shaping the fiber blanks together with the platform element assembled thereon in order to obtain a blade preform of a shape that is close to the shape of the blade that is to be fabricated;
    after shaping, consolidating the blade preform in its shape in a shaper; and
    performing final densification of the consolidated blade preform in order to obtain a composite-material blade having an incorporated platform.

15. The method according to claim 13, wherein a difference between the thickness of the central portion of the platform element and the thickness of the end portions of the platform element is equal to a thickness of the deployable connection portion of the fiber blank.

\* \* \* \* \*